United States Patent
Travis

[15] 3,642,100
[45] Feb. 15, 1972

[54] PAWL PARKING BRAKE WITH TOGGLE APPLY LINKAGE

[72] Inventor: William H. Travis, Union, Ohio
[73] Assignee: General Motors Corporation, Detroit, Mich.
[22] Filed: May 22, 1970
[21] Appl. No.: 39,832

[52] U.S. Cl. ................................................. 188/69
[51] Int. Cl. ............................................. B62c 7/02
[58] Field of Search ............................. 188/31, 60, 69

[56] References Cited

UNITED STATES PATENTS

| | | |
|---|---|---|
| 3,074,513 | 1/1963 | Robinson .............................. 188/69 |
| 3,393,776 | 7/1968 | Ludwig ........................ 188/218 XL |

FOREIGN PATENTS OR APPLICATIONS

| | | |
|---|---|---|
| 699,701 | 11/1953 | Great Britain ........................... 188/69 |
| 650,990 | 10/1928 | France ...................................... 188/31 |

Primary Examiner—George E. A. Halvosa
Attorney—W. E. Finken and D. D. McGraw

[57] ABSTRACT

In an automotive disc brake assembly, a parking brake which consists of a pawl pivotally connected to a nonrotatable member so as to engage one of a plurality of cooling ribs between the opposed surfaces of a rotor disc, thereby locking the rotor from moving.

2 Claims, 3 Drawing Figures

PATENTED FEB 15 1972  3,642,100

INVENTOR.
William H. Travis
BY
D. D. McGraw
ATTORNEY

PAWL PARKING BRAKE WITH TOGGLE APPLY LINKAGE

The invention relates to a mechanism for incorporating a parking brake into a wheel assembly having a disc brake. Prior art reveals a variety of parking brakes for use with disc brakes including separate caliper assemblies, mechanical and hydraulic devices which provide auxiliary means of applying the service disc brake pads to the rotor, and internally expanding or externally contracting shoe assemblies applied to an axially extending surface of the disc brake rotor.

The present invention comprises an improved parking brake for an automotive disc brake assembly. A mounting bracket is attached to a nonrotatable member of the wheel assembly. A pawl is affixed to a pivot pin which is rotatable in a bore through the mounting bracket and aligned to pivot into engagement with one of the rotor ribs which are located between the opposing surfaces of the disc brake rotor to aid in cooling the rotor. These rotor ribs are of sufficient strength to hold the weight of the car when parked on a grade, and have a beveled face which matches the beveled tooth of the pawl. A toggle apply linkage actuated by the brake cable acts upon a pawl lever attached to the pawl pivot pin to rotate the pawl into engagement of a rotor rib. If, upon parking brake actuation, the pawl should engage the rotor rib at its outer face instead of entering the airgap between the rotor ribs, a spring assembly in the cable stores actuating energy thereby maintaining tension on the cable which will cause the pawl to engage the beveled face of the rotor rib if the vehicle starts to roll. A release spring insures that the pawl will disengage the rotor rib when the actuating force is removed.

Figure 1:
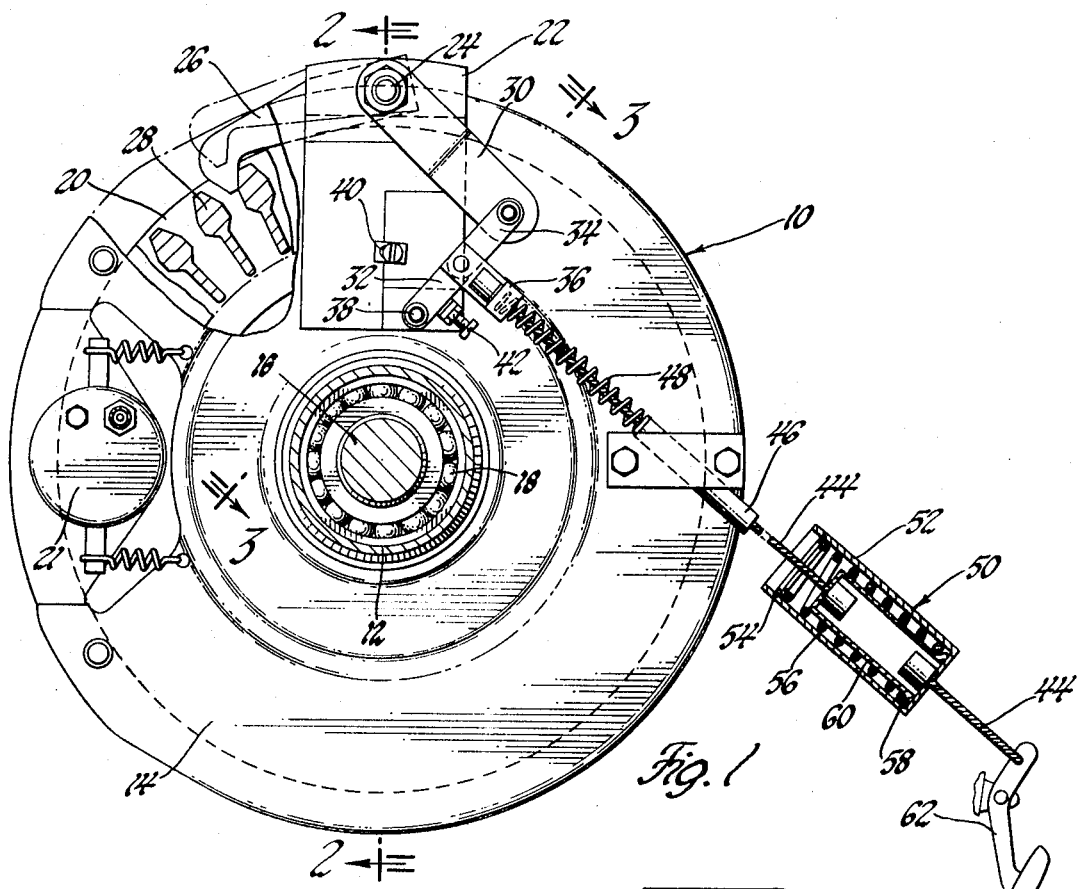
FIG. 1 is an elevation view of the vehicle disc brake assembly embodying the invention and having parts broken away and in section.
Figure 2:
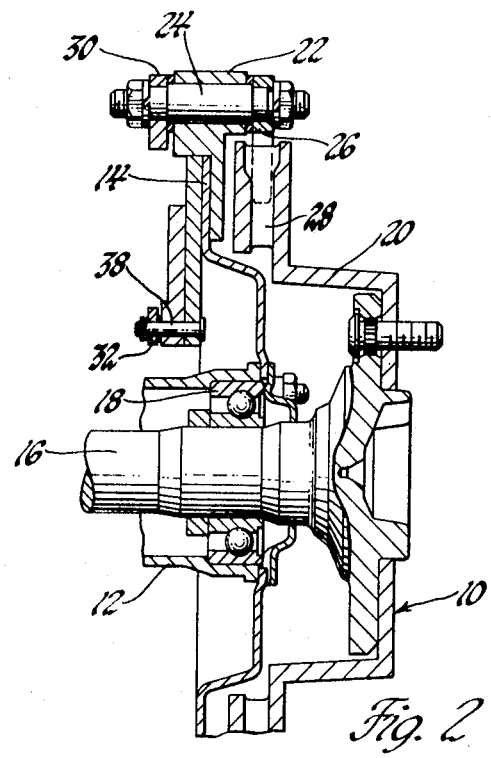
FIG 2 is a sectional view of the vehicle disc brake assembly of FIG. 1.
Figure 3:
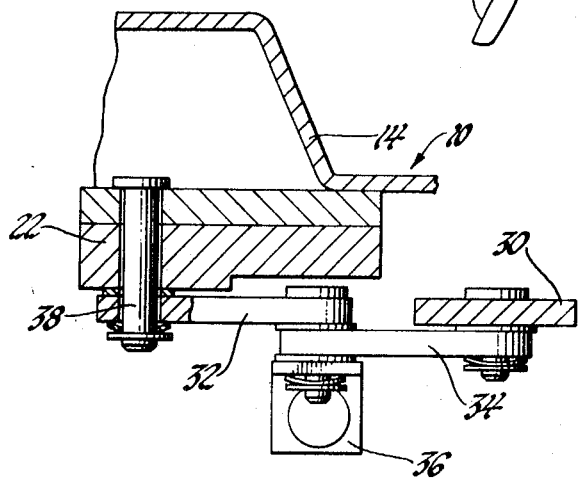
FIG. 3 is a sectional view of the vehicle disc brake assembly of FIG. 1 taken in the direction of arrows 3—3 of that figure.

The vehicle disc brake assembly 10 includes the nonrotatable axle housing 12 and shield and mounting flange 14. Axle 16 is journaled in bearing 18. Rotor disc 20 is attached to axle 16 and rotates upon movement of the vehicle. The vehicle wheel is attached to and rotates with axle 16 and rotor disc 20. Disc brake caliper assembly 21 is mounted on a nonrotatable member and is hydraulically actuable to move the brake pads into braking engagement with the rotor disc 20.

Mounting bracket 22 is attached to the shield and mounting flange 14. A pawl pivot pin 24 is rotatable in a bore through mounting bracket 22. Pawl 26 is attached to pawl pivot pin 24 and is rotatable therewith to engage one of the circumferentially spaced radially extending rotor ribs 28 which integrally connect the opposed surfaces of the rotor disc 20 and promote the transfer of heat from the rotor disc 20. Pawl 26 and rotor rib 28 have mating beveled surfaces. Pawl lever 30 is attached to pawl pivot pin 24. Toggle members 32 and 34 are pivotally joined at their connection with cable connector 36. Toggle member 32 is pivotally connected to mounting bracket 22 by toggle anchor pin 38. Toggle member 34 is pivotally connected to pawl lever 30. Stops 40 and 42 limit the travel of the toggle members. Cable 44 is terminated at cable connector 36. Cable bracket 46 is attached to the shield and mounting flange 14, guides cable 44, and seats release spring 48 which acts against cable connector 36.

Spring assembly 50 is interposed in cable 44. Outer cylindrical housing 52 has a closed end to which the cable 44 is attached and an open end in which spring seat 54 is engaged. Spring 56 is caged in outer cylindrical housing 52 and acts against the shoulder 58 of inner cylindrical housing 60 to urge the open end of inner cylindrical housing 60 into abutment with the closed end of outer cylindrical housing 52. The cable 44 is attached to the closed end of inner cylindrical housing 60. Cable 44 is terminated at parking brake control mechanism 62 which is an on and off mechanism such as a parking brake pedal.

OPERATION

Upon actuation of the parking brake control mechanism 62, cable 44 is tensioned, pulling toggle members 32 and 34 into a straight line relationship, pivoting pawl lever 30 and pawl pivot pin 24 and thereby causing pawl 26 to engage a rotor rib 28. Stop 42 limits the brake-applying movement of the toggle member thereby preventing the toggle members 32 and 34 from going over center. When the car is parked on a grade, the rotor ribs 28 exert a force against the pawl 26 in a disengaging direction. This force is transmitted back through the pawl lever 30 and into the toggle members 32 and 34 and through toggle anchor pin 38 to mounting bracket 22. Since the toggle members 32 and 34 are in a straight line, very little force in cable 44 is required to keep the pawl 26 engaged on the rotor rib 28.

If, upon parking brake actuation, the pawl 26 engages the outer face of rotor rib 28 instead of the beveled face, the brake actuating force is stored in the spring assembly 50. Spring 56 is compressed, and maintains tension on cable 44 until the vehicle moves allowing the pawl to be inserted between the rotor ribs. During normal actuation when the pawl is inserted directly between the rotor ribs, the spring assembly 50 functions only as a cable connector. Upon release of the parking brake control mechanism 82, tension is removed from the cable 44 and release spring 48 pushes the toggle members 32 and 34 off center. The force exerted on the pawl 26 by the rotor rib 28 and the force of the release spring 48 cooperate to disengage the pawl and collapse the toggle members 32 and 34 into abutment with stop 40.

Thus, an improved parking brake mechanism for disc brake equipped vehicles is provided. The pawl parking brake with toggle apply linkage offers a comparatively simple and economical means of incorporating a parking brake into a disc brake assembly which will provide sufficient holding force to satisfy requirements of an official nature as well as engineering standards of vehicle manufacturers.

What is claimed is:

1. In an automotive disc brake assembly, a parking brake mechanism comprising:

a rotor disc having opposed surfaces engaged by brake friction pads, the opposed surfaces being integrally connected by a plurality of circumferentially spaced radially extending ribs having beveled faces;

a mounting bracket mounted on a nonrotatable member of the brake assembly, the mounting bracket extending radially outward past the periphery of the rotor and having an axially extending bore therethrough;

a pawl pivot pin rotatable in the bore;

a pawl attached to the outer end of the pawl pivot pin and having a beveled face engageable with the beveled face of the rotor rib;

a pawl lever attached to the inner end of the pawl pivot pin;

a toggle anchor pin attached to the mounting bracket;

a toggle linkage including first and second toggle members respectively pivotally connected to the toggle anchor pin and the pawl lever;

a cable connector pivotally connecting the other ends of the first and second toggle members;

a cable attached to the cable connector and being subject to tension upon actuation of a control mechanism to pivot the pawl into engagement with one of the ribs;

stop means positioning the toggle linkage when the pawl engages the rotor rib so that the first and second toggle members assume a substantially straight line relationship whereby the toggle anchor pin receives the brake thrust; and release spring means acting to pivot the pawl out of engagement with the rotor rib when cable tension is relaxed.

2. The parking brake mechanism of claim 1 further characterized by spring means interposed in the brake cable for the storing of actuating force if upon actuation of the control mechanism the pawl is pivoted into engagement with the outer face of one of the plurality of rotor ribs thereby failing to engage the beveled face to lock the rotor, the spring being effective to actuate the toggle apply linkage urging the pawl into engagement of the beveled face upon movement of the rotor as the vehicle begins to roll.

* * * * *